United States Patent [19]

Baudrit et al.

[11] Patent Number: 5,031,884
[45] Date of Patent: Jul. 16, 1991

[54] CONTROLLABLE HYDRO-ELASTIC SUPPORT

[75] Inventors: Patrick Baudrit, Vertou; Jean-Pierre Blais, Nantes; Patrice Fort, Carquefou, all of France

[73] Assignee: Compagnie Des Produits Industriels de L'Ouest (C.P.I.O.), Carquefou Cedex, France

[21] Appl. No.: 403,451

[22] Filed: Sep. 6, 1989

[30] Foreign Application Priority Data

Sep. 6, 1988 [FR] France ................................. 88 11638

[51] Int. Cl.⁵ .......................... F16M 5/00; F16F 13/00
[52] U.S. Cl. .................................. 267/140.1; 180/312; 248/562; 248/636; 267/219
[58] Field of Search ............. 267/140.1 E, 140.1 AE, 267/140.1 R, 64.12, 219; 180/300, 312, 902; 248/562, 636

[56] References Cited

U.S. PATENT DOCUMENTS

| | | | |
|---|---|---|---|
| 4,583,723 | 4/1986 | Ozawa | 267/140.1 AE |
| 4,635,910 | 1/1987 | Ozawa et al. | 248/562 X |
| 4,650,170 | 3/1987 | Fukushima | 267/140.1 AE |
| 4,756,513 | 7/1988 | Carlson . | |
| 4,793,599 | 12/1988 | Ishioka | 248/562 X |

FOREIGN PATENT DOCUMENTS 0077195 4/1983 European Pat. Off. .
3447950 12/1985 Fed. Rep. of Germany .
2563880 11/1985 France .
116937 6/1985 Japan ........................ 267/140.1 AE

OTHER PUBLICATIONS

Patent Abstracts of Japan, vol. 12, No. 73 (M-674) [2920], 8 mars 1988; & JP-A-62 215 141 (Bridgestone Corp.) 21-09-1987 *Resume*.
Patent Abstrancts of Japan, vol. 8, No. 174 (M-316) [1611], 10 aout 1984; & JP-A-59 65 635 (Toyota Jidosha K.K.) 13-04-1984.

Primary Examiner—George E. A. Halvosa
Attorney, Agent, or Firm—Oblon, Spivak, McClelland, Maier & Neustadt

[57] ABSTRACT

A hydro-elastic support mounted between two mechanical elements, subjected to excitations of variable frequencies, and able to provide two levels of stiffness by simple outside control includes an elastic vault adapted to be fastened to one of the mechanical elements, a support adapted to be fastened to the other mechanical element, an upper fluid chamber, a compensation chamber limited by a membrane, a helical duct providing a communication of the fluid between the two chambers, and a central piston for compensation of movement of the fluid from the upper fluid chamber to the compensating chamber. The piston can be immobilized by any time by an integrated mechanism that can be controlled remotely.

3 Claims, 11 Drawing Sheets

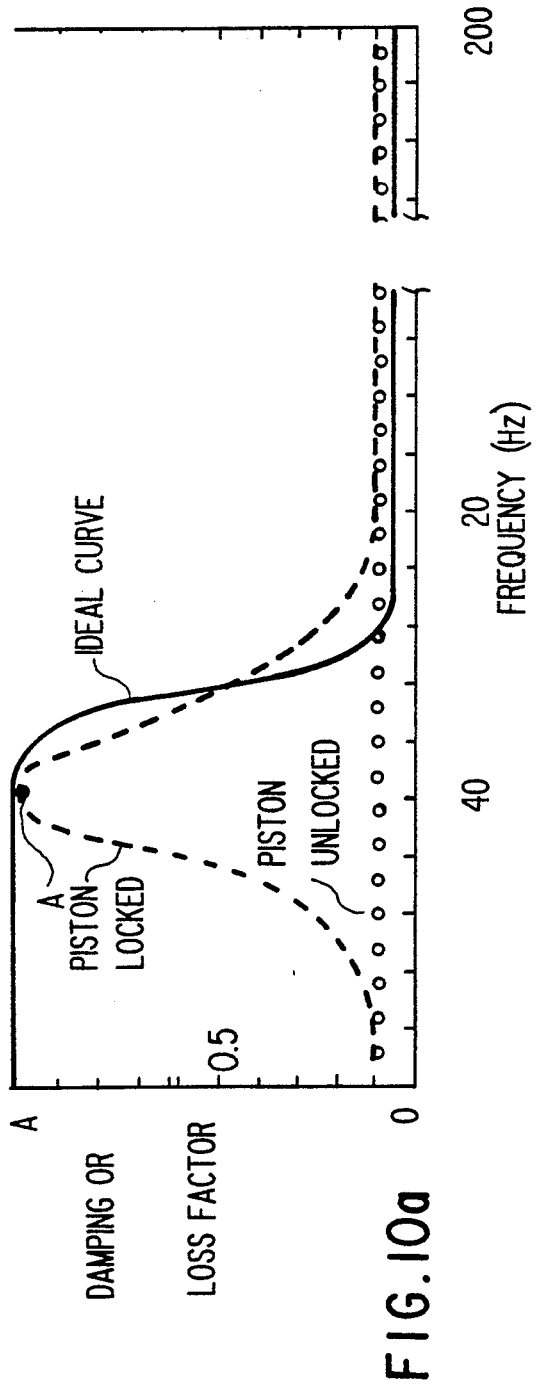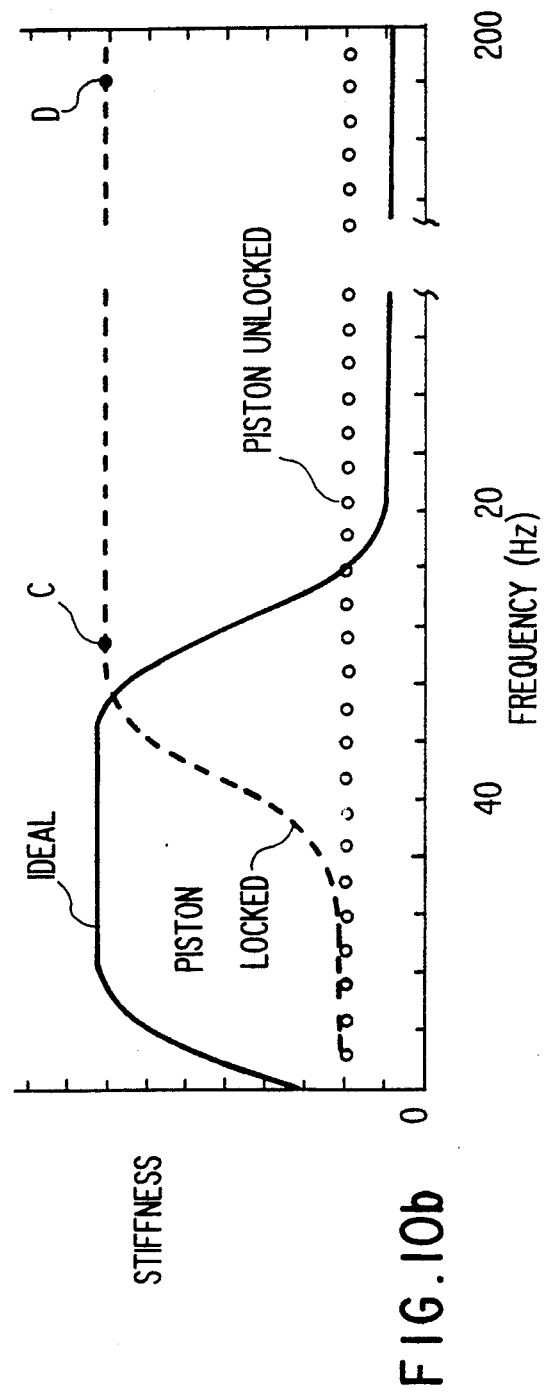

CONTROLLABLE HYDRO-ELASTIC SUPPORT

BACKGROUND OF THE INVENTION

1. Field of the Invention

This invention relates to a controllable hydro-elastic support mounted between two mechanical elements, subject to excitations and/or vibrations. More particularly, an elastic support when mounted between the engine and body of a motor vehicle is subjected to the vibration and excitation of the engine.

In the various stress conditions of the engine suspension, the following conditions are apparent:

The movements of great amplitude of vibration of the engine due to the sudden variations of engine torque are in the range between 0 and 10 Hz. To lessen these movements, the suspension must be stiff and damped.

The irregularities of the road induce vertical movements of the engine in the range between 10 Hz and 20 Hz. To reduce the harmful effects of these movements, the suspension must be damped.

When the engine is idling, it transmits vibrations to the body in the range between 15 Hz and 25 Hz. To insulate the body from these vibrations, the suspension must be flexible.

The masses in motion inside the engine generate forces of inertia which set the body vibrating, thus causing hummings in the range between 30 Hz and 300 Hz. To remedy this drawback, the suspension must be flexible.

The ideal response for the support is represented by the curves in solid lines shown in FIGS. 10A and 10B, FIG. 10A relates to the loss factor or phase shift, FIG. 10B relates to the stiffness of the support.

2. Description of the Related Art

Dampers are known that combine an elastic support of an elastomer and a hydraulic damping obtained by a throttling between two liquid chambers.

The variation in stiffness and damping as a function of frequency in these dampers is also known as shown by the dashed lines in FIG. 10B. At low frequency, the stiffness is close to the static stiffness, then goes to a continuous plateau of higher stiffness when the phase shift maximum is exceeded.

FIGS. 10A and 10B represent the variation in the damping (characterized by the loss factor tg $\delta.\delta$=loss angle), and stiffness as a function of the frequency.

The ideal response for the support is represented by the curves in solid lines shown in FIGS. 10A and 10B. The response of the standard support (which corresponds to a support according to the invention with a locked piston) is represented by the curves in dashes.

The curves in dashes show that the stiffness of a standard hydro-elastic support exhibits two plateaus as shown in FIG. 10B and that the loss angle has a bell-shaped variation as shown in FIG. 10A. Actually, in operation, the internal fluid goes from an upper cavity to a lower cavity by a duct; the effects of inertia cause the flow of the fluid in the duct to go through a maximum (corresponding to the maximum loss angle, point A in FIG. 10A), then to decrease to cancellation (minimum loss angle, maximum stiffness, point C to D in FIG. 10B).

It can be seen that this type of part provides a satisfactory behavior for a high damping (at 10 Hz to 20 Hz), but deviates from the ideal curve for the sudden variations in engine torque, idling and acoustics (at 0 to 10 Hz). Finally, the line comprised of small circles shows the response of the support with a free piston.

SUMMARY OF THE INVENTION

Accordingly, an object of this invention is to provide a novel vibration damper exhibiting two operating states in which the frequency range of the maximum damping can be varied.

According to the invention, the positioning of the stiffness plateaus have a great stiffness and a high damping to filter the unevenness of the road (10 Hz to 20 Hz) and a slight stiffness to filter the vibrations of the engine idling speed and the vibrations in the acoustic range (0 to 10 Hz).

The damper, according to the invention, is characterized by the fact that the separation between the two chambers constituting it is made mobile, and can be immobilized at will by the intervention of an electromagnet, a pneumatic action or any other means.

The present invention relates to a controllable hydro-elastic support mounted between two mechanical elements which are subjected to excitations and whose frequency and amplitude vary, said controllable hydro-elastic support comprising a support mounted to one of said mechanical elements, an elastic vault which is mounted to the other of said mechanical elements and to said support to enclose an upper fluid chamber, a compensation chamber in said support and limited by a membrane, a central piston separating said upper fluid chamber and said compensation chamber and being movable in response to pressure differences between said chambers to compensate for said pressure differences, a helical duct comprising means for providing restricted fluid communication between said upper fluid chamber and said compensation chamber, locking means located outside said support for immobilizing said piston, and means for limiting the movement of said central piston around an equilibrium position thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 corresponds to FIG. 2 but shows the support under a vertical load and the electromagnet not acted on.

FIGS. 10A and 10B show a representation of the performance curves of the system.

DESCRIPTION OF THE PREFERRED EMBODIMENTS

Figure 1:
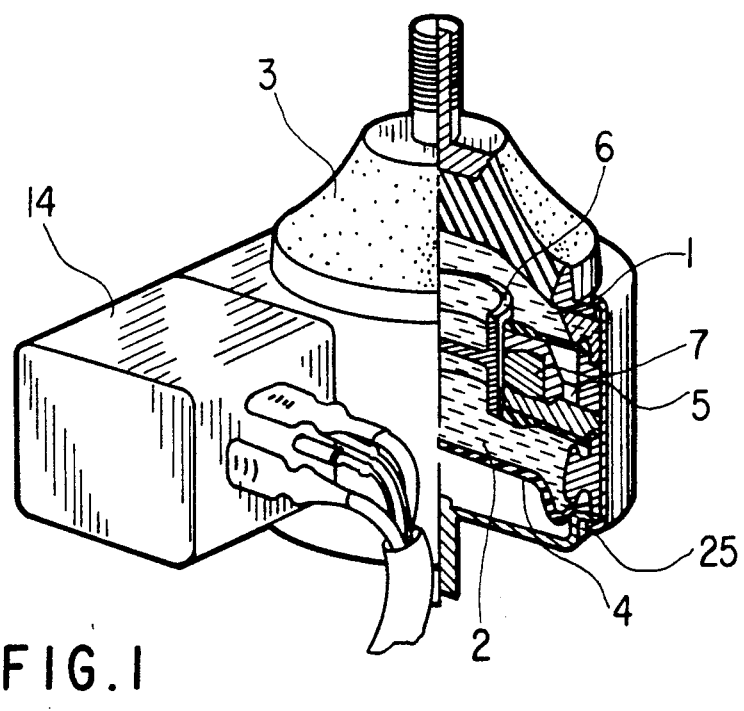
FIG. 1 represents the partial section of the support in perspective with its electromagnet.

The element as shown in the figures comprises an elastic vault 3, an upper fluid chamber 1, a compensation chamber 2 limited by a membrane 4, a central piston 6, a support 25, and a helical duct 5 forming a helix between the upper fluid chamber 1 and the compensation chamber 2 and providing the fluid communication between the two chambers. Solenoid 14 controls the change in state of the hydro-elastic support. The duct 5 is formed in a ring 9 and has one end 5a open to upper fluid chamber 1 and another end 5b open to compensation chamber 2. The ring 9 supports an elastic collar within which are coaxially mounted an elastomer sheath 8 and the piston 6.

Figure 2:
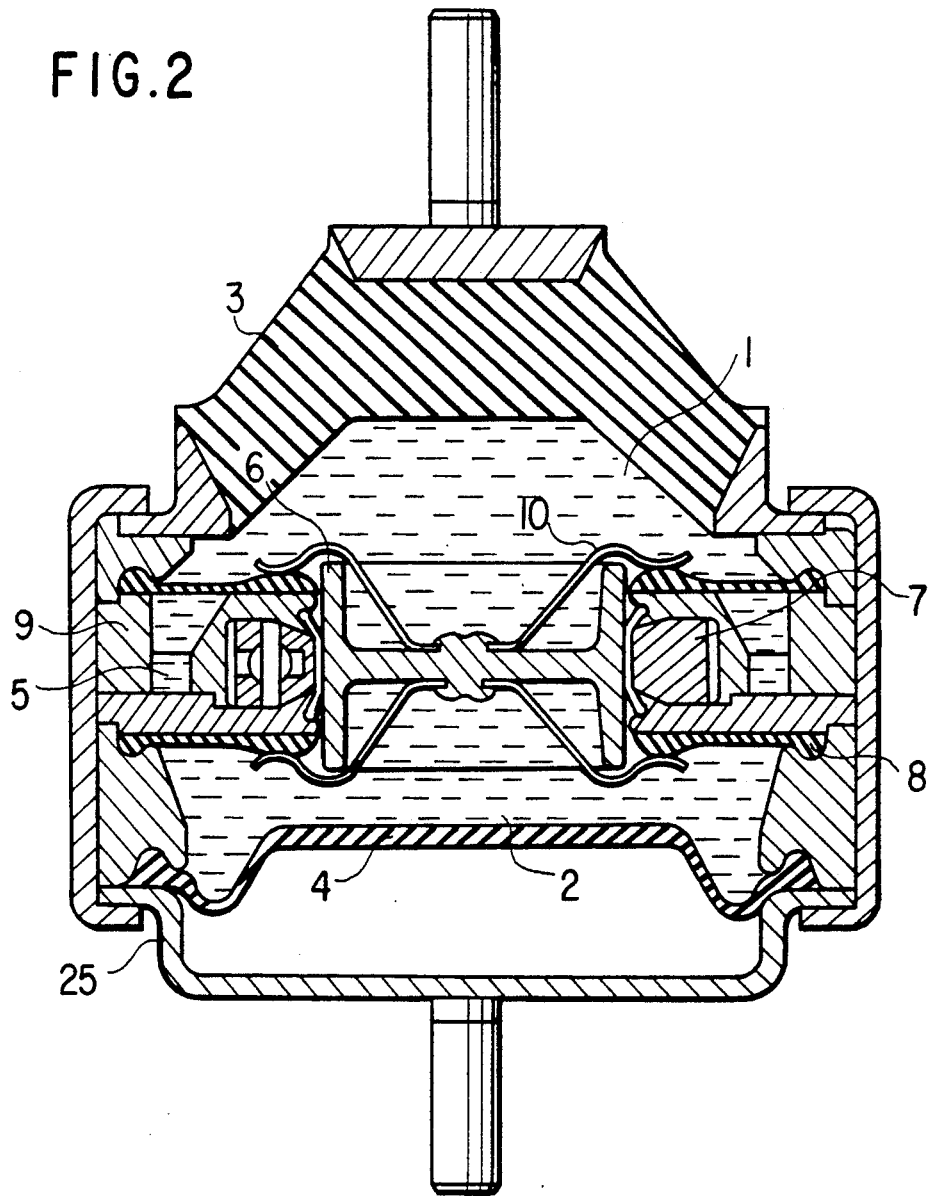
FIG. 2 shows a longitudinal section of the support controlled by the live electromagnet.

In the embodiment of FIG. 2, pressure from the elastic vault 3 acting o the fluid of upper chamber 1 moves it toward compensation chamber 2. When piston 6 is rendered immobile, the transfer of fluid from the upper chamber 1 to the compensation chamber 2 is performed through duct 5 whose section and length have been made so as to obtain a maximum phase shift for a set frequency.

When central piston 6 is free to move, it compensates for the movements of the fluid from chamber 1 toward chamber 2, by oscillating around its equilibrium position while being limited from large movements by the slight stiffness of spring blades 10 which provide the recentering of the piston 6. When central piston 6 is free to move, the largest part of the flow of the fluid is performed through the central part of the support and not through duct 5, thus making possible the balancing of the pressures between the two chambers.

Figure 3:
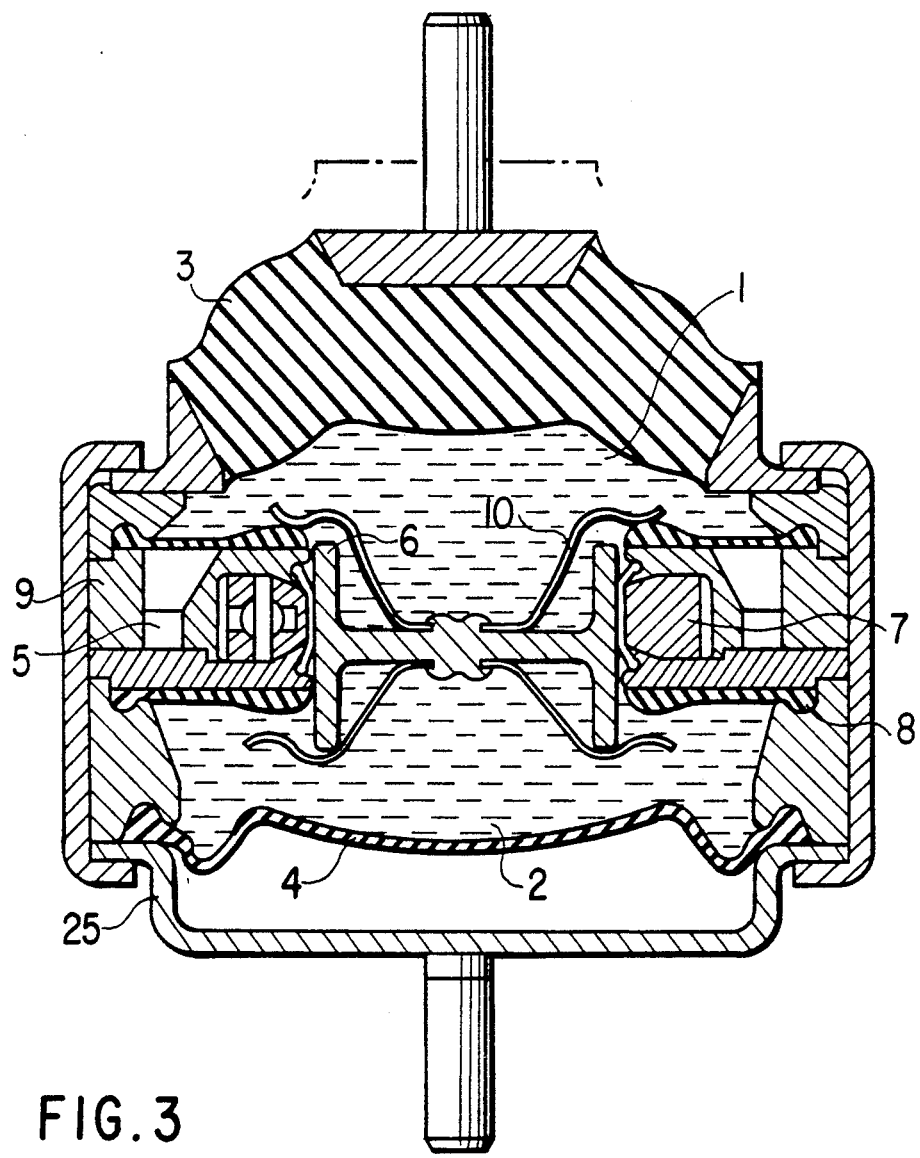
Figure 4:
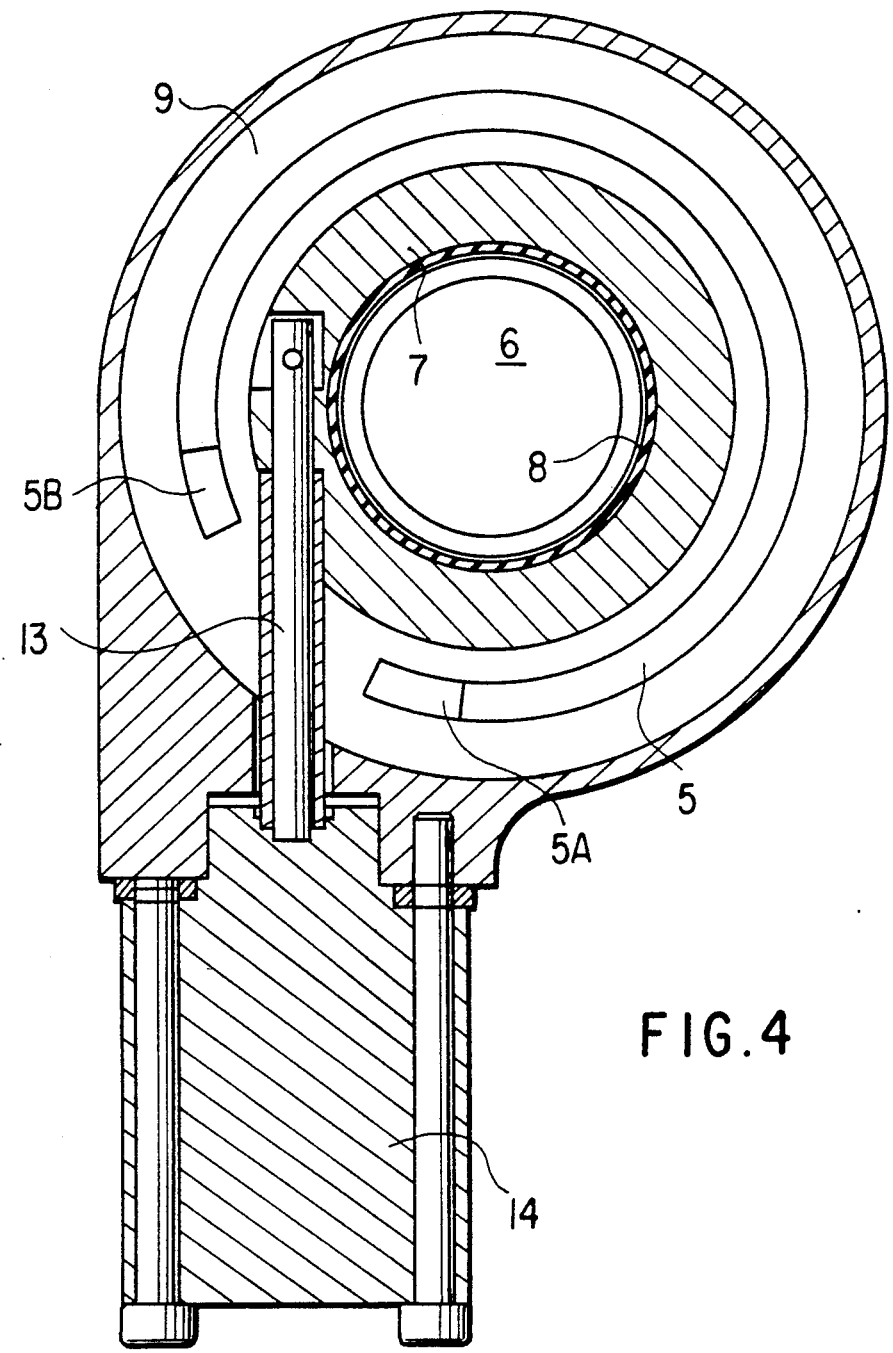
FIG. 4 shows a cross section of the assembly making it possible to determine the locking of the central piston by the electromagnet.

The essential role of the state of freedom of central piston 6 can be seen from FIGS. 2 and 3. In FIG. 2, the piston 6 is locked and thus the fluid flow is substantially through duct 5. In FIG. 3, the piston is unlocked and a vertical load is placed on the support. In this instance, the fluid flow is through the duct 5 and the central part of the support.

Figure 5:
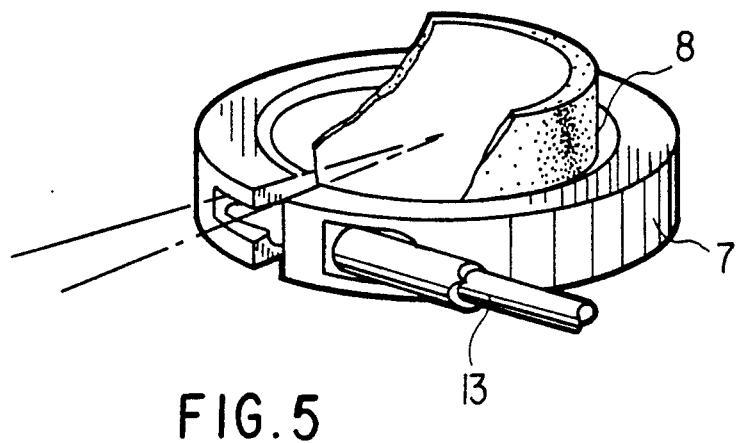
FIG. 5 represents a diagram in perspective of the collar and of the control rod.
Figures 6A, 6B:
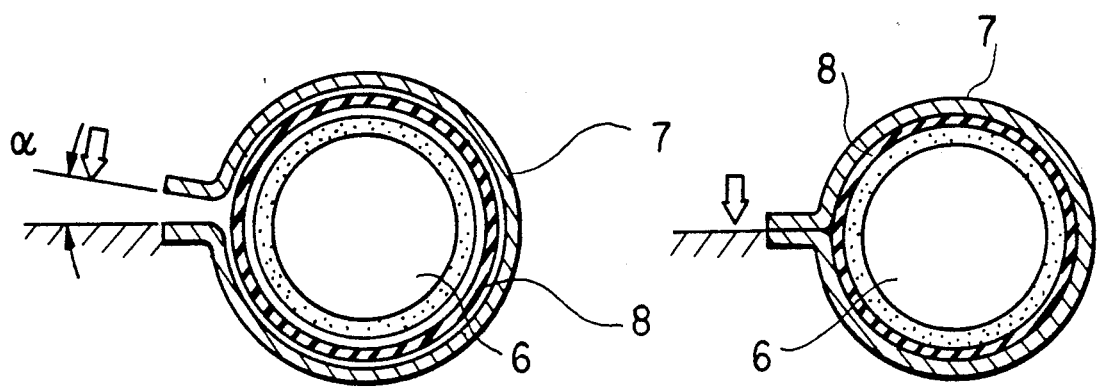
FIGS. 6A and 6B schematically show the operation of the collar when the control is acted on and not, respectively.

The locking mechanism will now be described with reference to FIGS. 4–9. Locking control of the piston (FIG. 4) is performed by solenoid 14 having braced rod 13 which connects to elastic collar 7, and so can tighten collar 7 around an elastomer sheath 8 when the solenoid 14 is actuated. The sheath 8 thus contracts around piston 6, while assuring the fluidtightness of the entire central part. FIGS. 5 and 6 detail the mode of action of the collar that controls the constricting of piston 6. In FIGS. 5 and 6A, the solenoid is in a relaxed position. When the rod 13 is retracted, the angle α of FIGS. 5 and 6A is reduced to 0 degrees, and the elastic collar 7 tightens around elastomer sheath 8 which contracts around central piston 6 (FIG. 6B).

Figure 7:
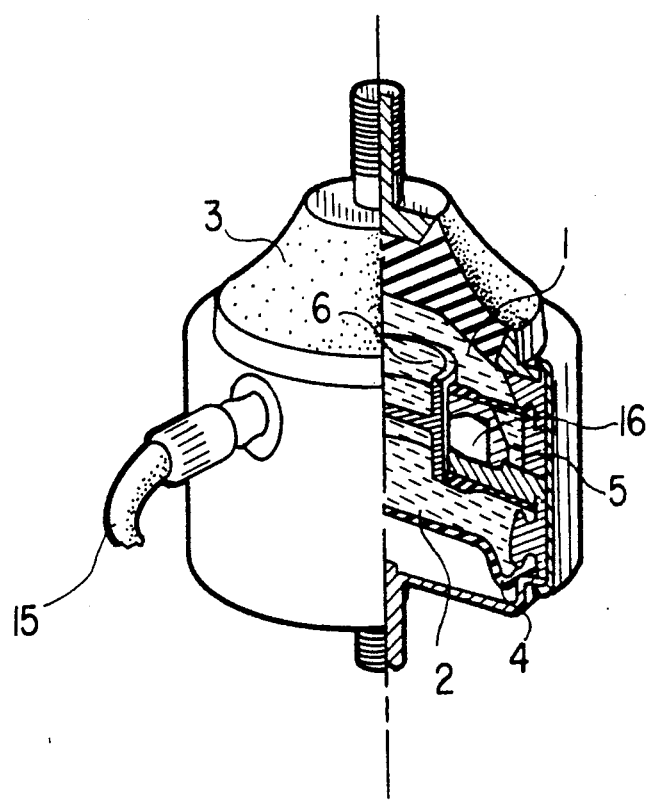
FIG. 7 shows a partial section of the same support whose control is pneumatic.
Figure 8:
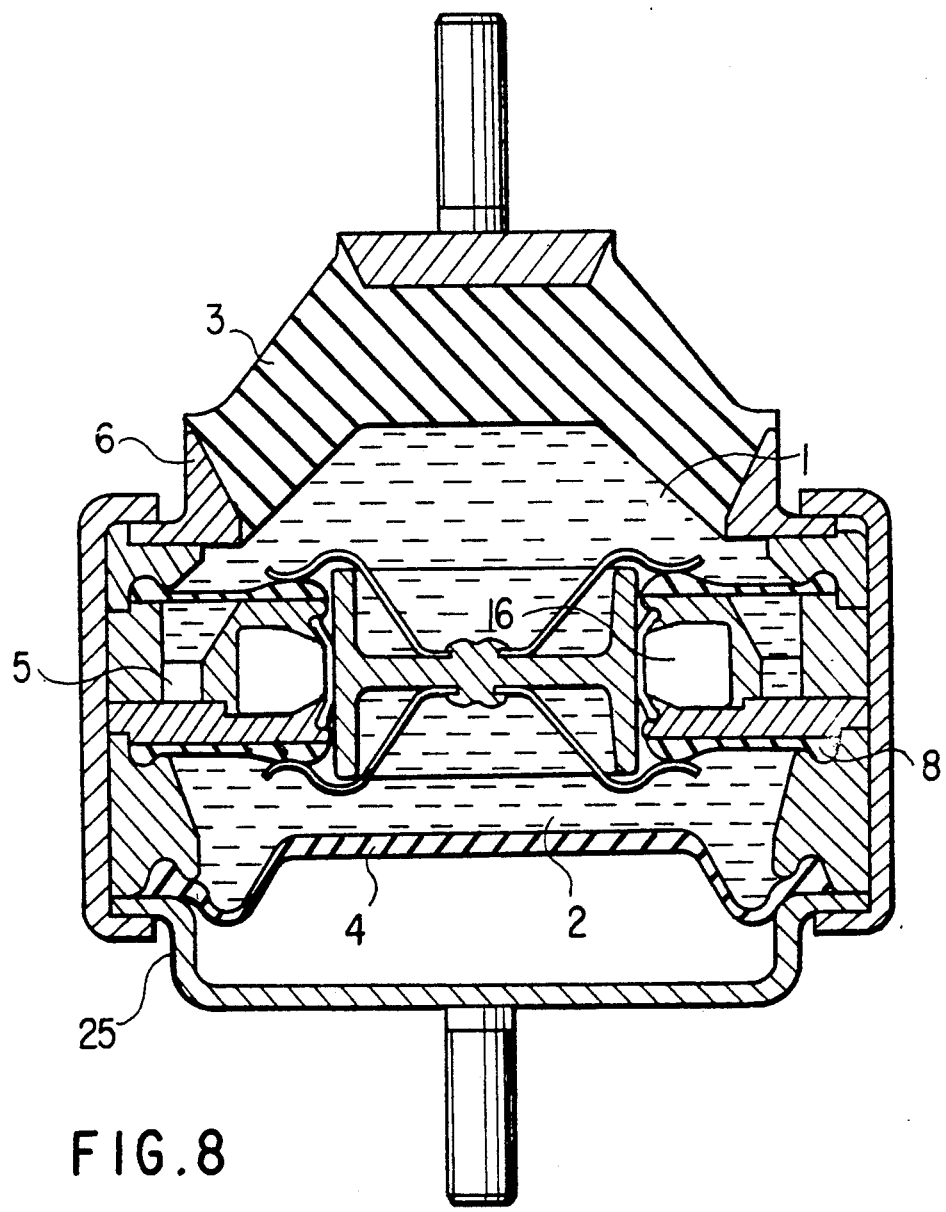
FIG. 8 shows a longitudinal section of the pneumatic control support when it is under pressure.

The locking control of the central piston can be other than mechanical in origin. FIGS. 7 and 8 show a pneumatic control support, in partially sectioned perspective, where air intake 15 and chamber 16 can be located in the central casing.

In FIG. 8, it is possible to see the contraction of elastomer sheath 8 around the piston by the expansion of peripheral chamber 16 under the influence of the internal air pressure supplied by intake 15.

Figure 9:
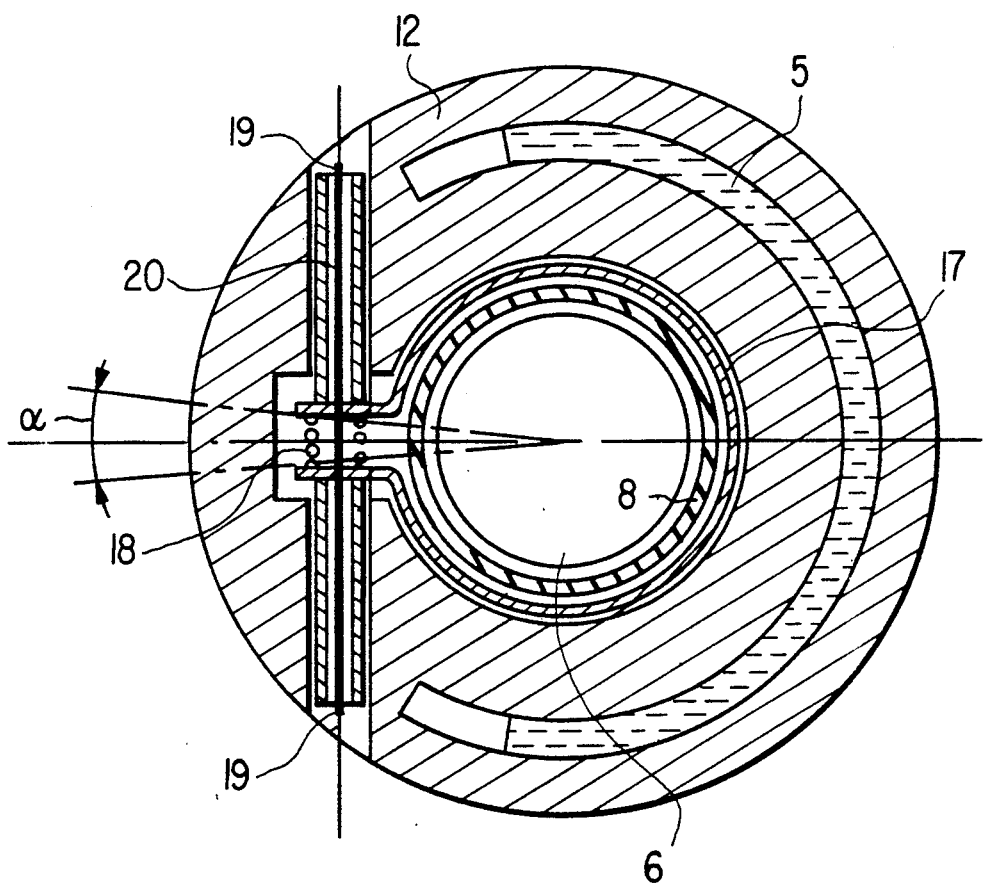
FIG. 9 shows a representation in cross section of a control by wire of an alloy having shape memory.

In the embodiment of FIG. 9, the actuation of the system is provided by an alloy wire 20 having shape memory characteristics and fixed to extensions of collar 17 at 19. In a free position and at an ambient temperature, wire 20, under the force of return spring 18, returns to its elongated position which makes it possible for collar 17 to loosen its constriction around central piston 6.

During the heating of the wire by the Joule effect or any other means, it reaches its transformation temperature which brings it back to the shape that it has in memory (i.e., the contracted shape). Therefore the two hooking points at the end of braces 19 approach one another and compress the spring. They thus tighten the collar around the elastomer sheath, again providing the locking of the latter.

Figure 11A:
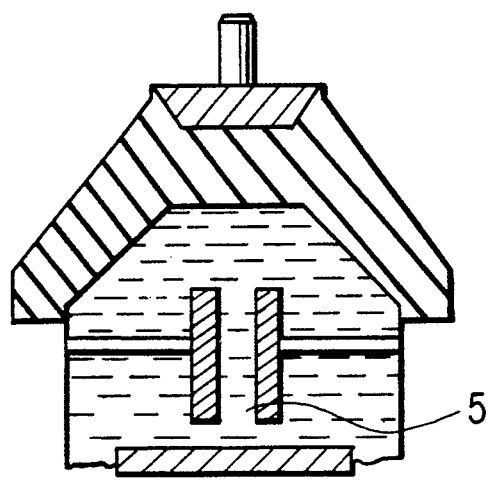
FIGS. 11A to 11F show a diagrammatic representation of the two operating states.
Figure 11B:
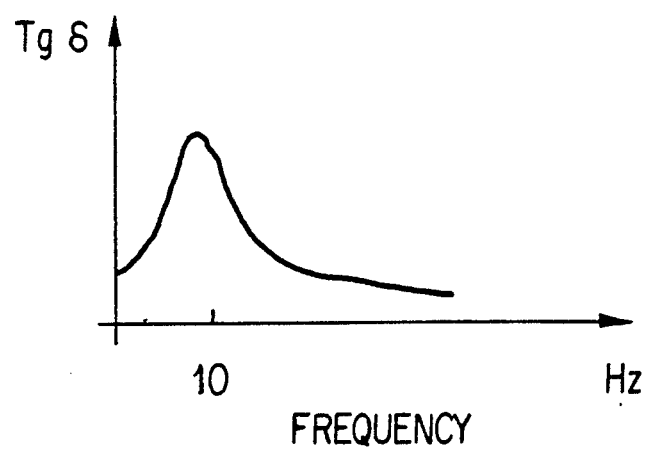
Figure 11C:
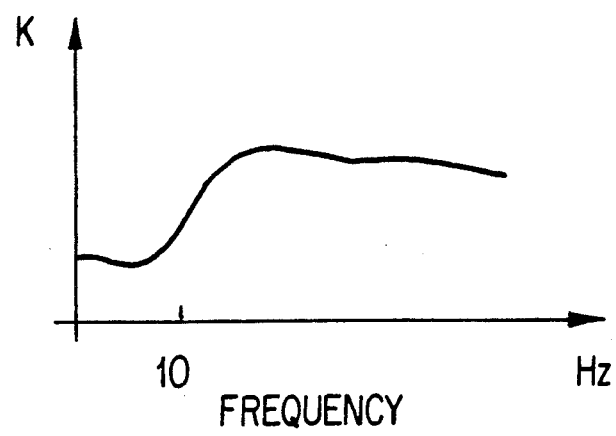

FIGS. 11A–11C are a schematic representation of the fluid flow within the support when the piston 6 is locked. In this case, the flow from the upper fluid chamber to the compensation chamber is substantially through duct 5 and thus FIG. 11A illustrates a restricted flow. The curves of FIGS. 11B and 11C correspond to the dashed line curve of FIGS. 10A and 10B respectively FIG. 11B represents a graph of the loss factor or phase shift versus frequency and FIG. 11C represents stiffness versus frequency.

Figure 11D:
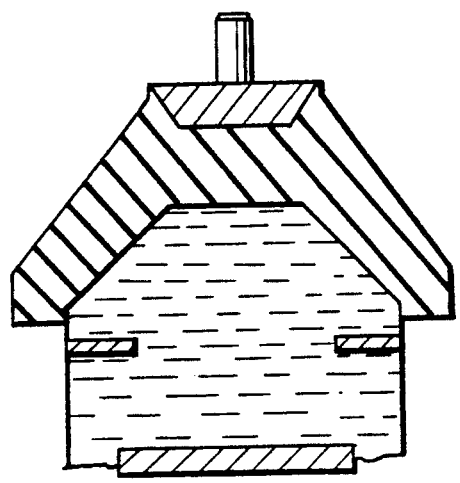
Figure 11E:
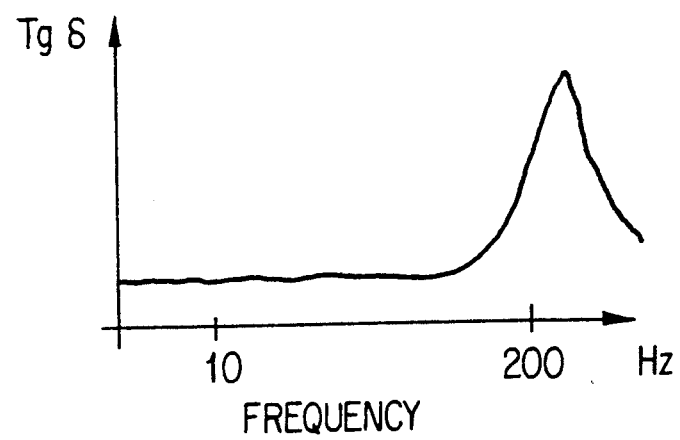
Figure 11F:
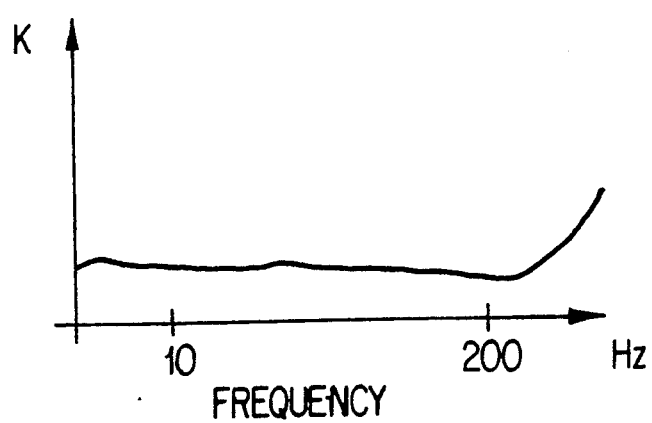

FIGS. 11D–11F are a schematic representation of the fluid flow within the support when the piston is unlocked. In this case, the flow from the upper fluid chamber to the compensation chamber is through both the duct and the central portion of the support (by movement of the piston 6) and thus FIG. 11D illustrates a greater fluid flow. FIGS. 11E and 11F relate to the same variables as FIGS. 11B and 11C and correspond to the line represented by small circles illustrated in FIGS. 10A and 10B respectively.

The case of the sudden variations in torque, which depend a great deal on the configuration of the suspension, can be treated either by the incorporation of limiters in the support itself, or by the addition to the suspension of a small limitation rod.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A controllable hydro-elastic support mounted between two mechanical elements which are subjected to excitations and whose frequency and amplitude vary, said controllable hydro-elastic support comprising:
   a support mounted to one of said mechanical elements;
   an elastic vault which is mounted to the other of said mechanical elements and to said support to enclose an upper fluid chamber;
   a compensation chamber in said support and limited by a membrane;
   a central piston separating said upper fluid chamber and said compensation chamber and being movable in response to pressure differences between said chambers to compensate for said pressure differences, said movable piston permitting a continuous transfer of fluid between said upper chamber and said compensation chamber;

a helical duct comprising means for providing restricted fluid communication between said upper fluid chamber and said compensation chamber;

locking means for immobilizing said piston and creating said restricted fluid communication between said upper fluid chamber and said compensation chamber through said helical duct; and means for limiting the movement of said central piston around an equilibrium position thereof;

wherein said locking means comprises:

electromagnetic means mounted to an elastic collar; and an elastic sheath which is disposed within said elastic collar and circumferentially surrounds said piston;

wherein said piston is immobilized by the contraction around said piston of said elastomer sheath by said elastic collar whose deformation is caused by said electromagnetic means.

2. A controllable hydro-elastic support mounted between two mechanical elements which are subjected to excitations and whose frequency and amplitude vary, said controllable hydro-elastic support comprising:

a support mounted to one of said mechanical elements;

an elastic vault which is mounted to the other of said mechanical elements and to said support to enclose an upper fluid chamber;

a compensation chamber in said support and limited by a membrane;

a central piston separating said upper fluid chamber and said compensation chamber and being movable in response to pressure differences between said chambers to compensate for said pressure differences, said movable piston permitting a continuous transfer of fluid between said upper chamber and said compensation chamber;

a helical duct comprising means for providing restricted fluid communication between said upper fluid chamber and said compensation chamber;

locking means for immobilizing said piston and creating said restricted fluid communication between said upper fluid chamber and said compensation chamber through said helical duct; and means for limiting the movement of said central piston around an equilibrium position thereof;

wherein said locking means comprises:

an elastomer sheath which circumferentially surrounds said central piston; and an air pressure chamber surrounding said elastomer sheath;

wherein said central piston is immobilized by the contraction around said piston of said elastomer sheath under the influence of internal air pressure established in said chamber.

3. A controllable hydro-elastic support mounted between two mechanical elements which are subjected to excitations and whose frequency and amplitude vary, said controllable hydro-elastic support comprising:

a support mounted to one of said mechanical elements;

an elastic vault which is mounted to the other of said mechanical elements and to said support to enclose an upper fluid chamber;

a compensation chamber in said support and limited by a membrane;

a central piston separating said upper fluid chamber and said compensation chamber and being movable in response to pressure differences between said chambers to compensate for said pressure differences, said movable piston permitting a continuous transfer of fluid between said upper chamber and said compensation chamber;

a helical duct comprising means for providing restricted fluid communication between said upper fluid chamber and said compensation chamber;

locking means for immobilizing said piston and creating said restricted fluid communication between said upper fluid chamber and said compensation chamber through said helical duct; and means for limiting the movement of said central piston around an equilibrium position thereof;

wherein said locking means comprises:

a wire having a shape memory, said wire being connected to an elastic collar which circumferentially surrounds an elastomer sheath which surrounds said central piston;

wherein said central piston is immobilized by the contraction around said piston of said elastomer sheath by said elastic collar whose deformation is caused by the action of said wire having said shape memory.

* * * * *